(12) United States Patent
Lin et al.

(10) Patent No.: US 9,024,204 B2
(45) Date of Patent: May 5, 2015

(54) ARESISTIVE DEVICE WITH FLEXIBLE SUBSTRATE AND METHOD FOR MANUFACTURING THE SAME

(75) Inventors: Yen-Ting Lin, Hsin-chu (TW); Dar-Win Lo, Hsin-chu (TW); Sung-Chan Yen, Hsin-chu (TW); Hsing-Kai Cheng, Hsin-chu (TW)

(73) Assignee: Cyntec Co., Ltd., Hsin-Chu (TW)

( * ) Notice: Subject to any disclaimer, the term of this patent is extended or adjusted under 35 U.S.C. 154(b) by 1 day.

(21) Appl. No.: 13/548,015

(22) Filed: Jul. 12, 2012

(65) Prior Publication Data
US 2013/0025915 A1 Jan. 31, 2013

(30) Foreign Application Priority Data

Jul. 28, 2011 (TW) .............................. 100126756 A

(51) Int. Cl.
*H05K 1/16* (2006.01)
*B32B 37/02* (2006.01)
*H01C 1/142* (2006.01)
*H01C 7/00* (2006.01)
*H01C 7/06* (2006.01)
*B32B 37/12* (2006.01)

(52) U.S. Cl.
CPC ............. *B32B 37/02* (2013.01); *B32B 37/1207* (2013.01); *B32B 2309/105* (2013.01); *B32B 2363/00* (2013.01); *B32B 2457/08* (2013.01); *H01C 1/142* (2013.01); *H01C 7/003* (2013.01); *H01C 7/06* (2013.01)

(58) Field of Classification Search
CPC .......... H01C 13/02; H01C 17/06; H01C 1/00; H01C 1/142; H01C 7/00; H01C 7/06; H05K 3/361; H05K 1/0393; H05K 2201/09881; H05K 2203/0723; H05K 3/244; H05K 3/28; H05K 3/323; H05K 3/3473; H05K 3/386; H05K 2201/10303; H05K 2201/10424; H05K 2201/10871; H05K 3/321
USPC .......... 174/250–268; 338/327, 308, 309, 314, 338/306
See application file for complete search history.

(56) References Cited

U.S. PATENT DOCUMENTS

| | | | | |
|---|---|---|---|---|
| 5,270,493 A | * | 12/1993 | Inoue et al. | 174/253 |
| 5,312,442 A | | 5/1994 | O'phelan | |
| 5,493,074 A | * | 2/1996 | Murata et al. | 174/254 |
| 5,781,100 A | | 7/1998 | Komatsu | |
| 6,143,990 A | | 11/2000 | Kuramochi et al. | |

(Continued)

FOREIGN PATENT DOCUMENTS

| | | |
|---|---|---|
| CN | 1695209 A | 11/2005 |
| CN | 201087845 Y | 7/2008 |

(Continued)

OTHER PUBLICATIONS

Office Action dated Dec. 11, 2014 of the corresponding China patent application No. 201110214863.5.

*Primary Examiner* — Ishwarbhai B Patel
(74) *Attorney, Agent, or Firm* — Chun-Ming Shih; HDLS IPR Serices

(57) ABSTRACT

A resistive device includes a resistive layer, a flexible substrate arranged on the resistive layer, and an electrode layer. The electrode layer includes two electrode sections arranged below the resistive layer and separate to each other. Moreover, a method for manufacturing the resistive device with flexible substrate is also disclosed.

7 Claims, 7 Drawing Sheets

(56) References Cited

U.S. PATENT DOCUMENTS

| | | | |
|---|---|---|---|
| 6,229,098 B1 * | 5/2001 | Dunn et al. | 174/260 |
| 7,158,383 B2 * | 1/2007 | Durocher et al. | 361/749 |
| 7,221,254 B2 * | 5/2007 | Tsukada | 338/309 |
| 7,247,250 B2 | 7/2007 | Gerber et al. | |
| 2009/0174521 A1 | 7/2009 | Ihle et al. | |
| 2010/0039211 A1 * | 2/2010 | Wang et al. | 338/204 |

FOREIGN PATENT DOCUMENTS

| | | |
|---|---|---|
| CN | 101364463 A | 2/2009 |
| CN | 101369478 A | 2/2009 |
| JP | 1129401 A | 5/1989 |
| JP | 2008072152 A | 3/2008 |
| TW | 405129 B | 9/2000 |
| TW | 511434 B | 11/2002 |
| TW | I220165 B | 8/2004 |
| TW | 200502997 | 1/2005 |
| TW | 200512463 | 4/2005 |
| TW | 200632950 | 9/2006 |
| TW | 200910388 A | 3/2009 |
| TW | 201007780 | 2/2010 |
| TW | 201035999 A | 10/2010 |

\* cited by examiner

A RESISTIVE DEVICE WITH FLEXIBLE SUBSTRATE AND METHOD FOR MANUFACTURING THE SAME

BACKGROUND OF THE INVENTION

1. Field of the Invention

This invention generally relates to a resistive device, and in particular to a resistive device with flexible substrate.

2. Description of Prior Art

As technology of electric circuit has a continuous development, the requirement for stability of resistance of a resistive device is increased. Some features such as temperature coefficient of resistance (TCR) of traditional chip type resistive device have been not satisfied for the requirement of high stability so that the application is limited.

As shown in FIG. 1, in order to enhance the heat stability of resistance of a resistive device, there has a conventional resistive device 10 provided. The resistive device 10 has a substrate 11 made of ceramic material, a resistive layer 12 located on a lower surface of the substrate 11, a copper foil layer 13 located on an upper surface of the substrate 11, side electrodes 14 respectively located at two sides of the substrate 11 and a protective layer 15 located on the copper foil layer 13. The operative power of the resistive device 10 can be enhanced by the copper foil layer 13 which has excellent heat dissipation to dissipate the heat generated when the resistive device 10 is operated.

However, as the electric device pursues a trend of miniaturization, the resistive device should follow the trend of miniaturization. The substrate of the above resistive device is made of ceramic which is easy to crack during the manufacturing process due to hardness and brittleness. Therefore, there is a limitation for further miniaturizing the resistive device. Moreover, a conventional adhesive for adhering the substrate 11 and the resistive layer 12 or the copper foil layer 13 may contain glass fiber material to provide a preferable support after curing. However, the glass fiber material has poor flexibility after curing, so that there is another limitation for the application of the resistive device. Also, because glass fiber material has poor heat dissipation and may block the heat transfer from the substrate 11 toward the resistive layer 12 or the copper foil layer 13, the operative power of the resistive device 10 cannot be enhanced.

SUMMARY OF THE INVENTION

It is one object of the present invention to provide a resistive device having a substrate made without using ceramic material in order to reduce the size.

To achieve the above object, the present invention provides the resistive device having flexible substrate. The resistive device comprises a flexible substrate, a resistive layer and an electrode layer. The flexible substrate may be located on the resistive layer. The electrode layer has a first electrode part and a second electrode part located on the resistive layer opposed to the flexible substrate and separated with each other.

The invention provides a method for manufacturing a resistive device having flexible substrate comprising steps of providing a flexible substrate; forming a resistive layer on the flexible substrate; and forming an electrode layer located on the resistive layer opposed to the flexible substrate. The electrode layer has a first electrode part and a second electrode part separated with each other.

In addition, the invention provides another method for manufacturing a resistive device having flexible substrate comprising steps of providing a flexible substrate and a resistive layer directly attached with each other; and forming an electrode layer located on the resistive layer opposed to the flexible substrate. The electrode layer has a first electrode part and a second electrode part separated with each other.

DETAILED DESCRIPTION OF THE INVENTION

The detailed description and technical content of the present invention with reference to the drawings, which merely provides reference and illustration without having an intention to limit the present invention, illustrates as following.

Figure 1:
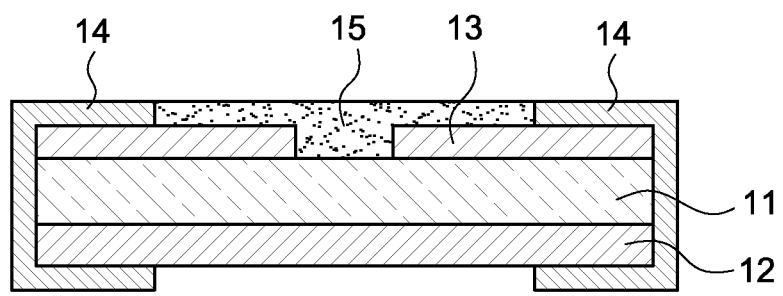
FIG. 1 shows a sectional view of a convention resistive device.
Figure 2:
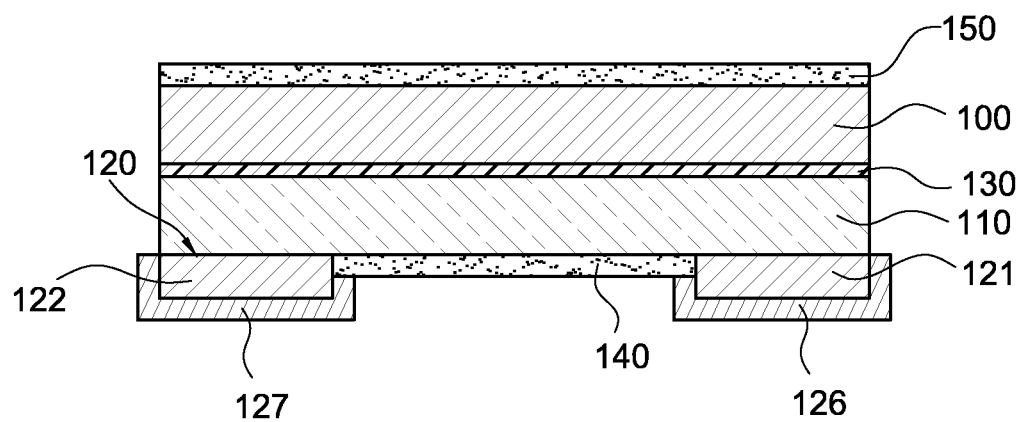
FIG. 2 shows a sectional view of a first embodiment of resistive device according to the invention.

Please refer to FIG. 2. FIG. 2 shows a first embodiment of a resistive device according to the present invention. The resistive device 20 mainly includes a flexible substrate 100, a resistive layer 110 located on the flexible substrate 100, an electrode layer 120 located on the resistive layer 110 opposed to the flexible substrate 100, and an adhesive layer 130 between the resistive layer 110 and the flexible substrate 100.

The resistive layer 110 is made of Ni—Cu alloy, Ni—Cr alloy, F—Cr alloy, Cu—Mn alloy, Cu—Mn—Sn alloy, Ni—Cr—Al alloy, Ni—Cr—Fe alloy, and so on. In the embodiment, the resistive layer 110 is a sheet of Ni—Cu alloy with a thickness of 50~300 μm. The resistive layer 110 is a whole rectangular sheet or may form special shape of opening or groove thereon to have a predetermined resistance value.

The flexible substrate 100 is plastic material, such as polyimide (PI), polyethylene terephthalate (PET), bismaleimide-triazine resin (BT resin), having preferable chemical stability with a thickness of 12~45 μm.

The adhesive layer 130 may be material of epoxy and acrylic resin etc. with a thickness of 13~102 μm. Also, the adhesive layer 130 may be a heat dissipation adhesive with a property of heat dissipation.

The electrode layer 120 includes a first electrode part 121 and a second electrode part 122 located at two opposite sides of a lower surface of the resistive layer 110. The first electrode part 121 and a second electrode part 122 have material of copper or copper alloy. In addition, the resistive device 20 of the embodiment may further include a first outer welding layer 126 covering the first electrode part 121 and a second outer welding layer 127 covering the second electrode part 122. The first outer welding layer 126 and the second outer welding layer 127 may be used to connect other external components. The first outer welding layer 126 and the second outer welding layer 127 may include a single welding layer or welding multi-layer such as Ni layer and Sn layer formed by electroplating or sputtering process.

In order to prevent the resistive layer 110 from contamination or oxidation, a first protective layer 140 may cover on the lower surface of the resistive layer 110 between the first electrode part 121 and the second electrode part 122. Furthermore, the resistive device 20 of the embodiment may further cover a second protective layer 150 on an upper surface of the flexible substrate 100. The first protective layer 140 and the second protective layer 150 may have material of epoxy and acrylic resin.

In the embodiment, there is not provided a ceramic substrate that is hard to work in the resistive deviceso that the resistive device can be easily further reduced the size. In addition, because both the flexible substrate 100 and the adhesive layer 130 are flexible, the resistive device 20 may have preferable flexibility, and thus the use of the resistive device is wide-spreading.

Also, the flexible substrate 100 may be easily made thinner because of good workability in such a manner that the resistive device 20 of the present invention has lower thermal impedance. The adhesive layer 130 of the present invention may have preferable heat conductivity due to without using glass fiber.

Figure 3:
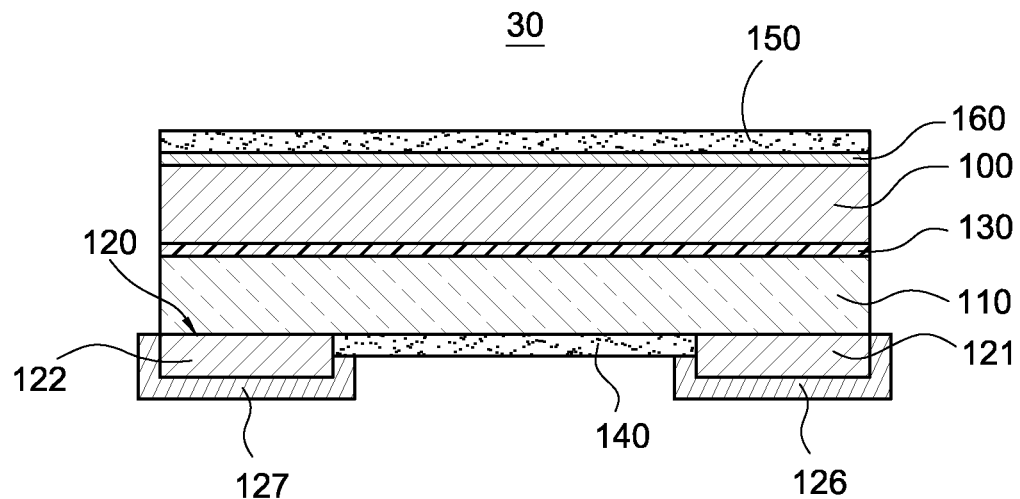
FIG. 3 shows a sectional view of a second embodiment of resistive device according to the invention.

Please refer to FIG. 3. FIG. 3 shows a second embodiment of a resistive device according to the present invention. The difference between the second embodiment and the first embodiment is that the resistive device 30 of the second embodiment may further include a metal layer 160 sandwiched between the flexible substrate 100 and the second protective layer 150. The effect of heat dissipation of the resistive device 30 can be enhanced by preferable heat conductivity of the metal layer 160. In this embodiment, the metal layer 160 may preferably have a thickness of 8~105 μm, further preferably have a thickness of 8~70 μm, and particularly preferably have a thickness of 8~35 μm of copper, copper alloy or other metal material with preferable heat dissipation.

Figure 4:
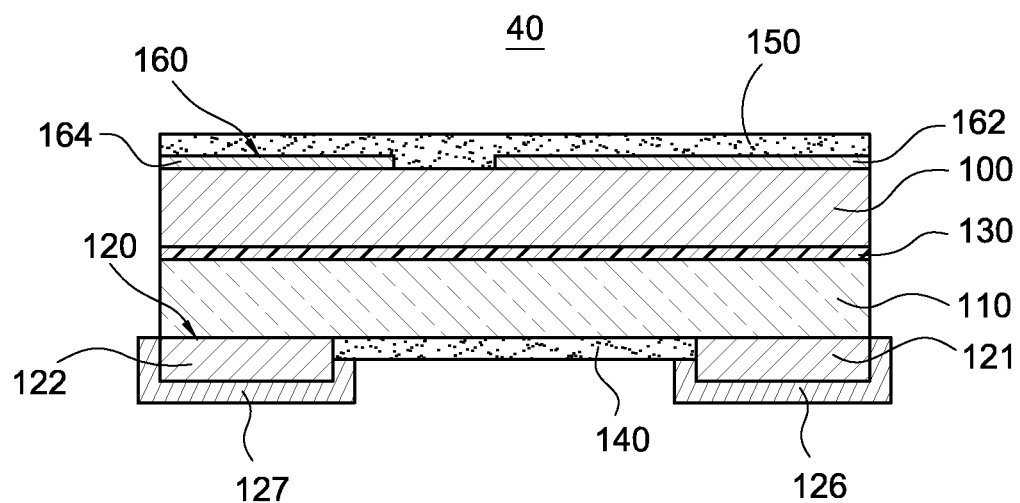
FIG. 4 shows a sectional view of a third embodiment of resistive device according to the invention.

Please refer to FIG. 4. FIG. 4 shows a third embodiment of a resistive device 40 according to the present invention. The difference between the third embodiment and the second embodiment is that the resistive device 40 of the third embodiment may further include a metal layer 160 having a first metal sheet 162 and a second metal sheet 164 separated with each other, and sandwiched between the flexible substrate 100 and the second protective layer 150. There is no limitation for the shape of the first metal sheet 162 and the second metal sheet 164, and the shape may be directed according to the required heat dissipation. In this embodiment, the second protective layer 150 covers the first metal sheet 162 and the second metal sheet 164, and fills into an area between the first metal sheet 162 and the second metal sheet 164. In another embodiment, the second protective layer 150 may only fill into the area between the first metal sheet 162 and the second metal sheet 164 without covering the first metal sheet 162 and the second metal sheet 164. In the embodiment, the first metal sheet 162 and the second metal sheet 164 may have material of copper or copper alloy with a preferable thickness of 8~105 μm, a further preferable thickness of 8~70 μm and a particular preferable thickness of 8~35 μm.

Figure 5:
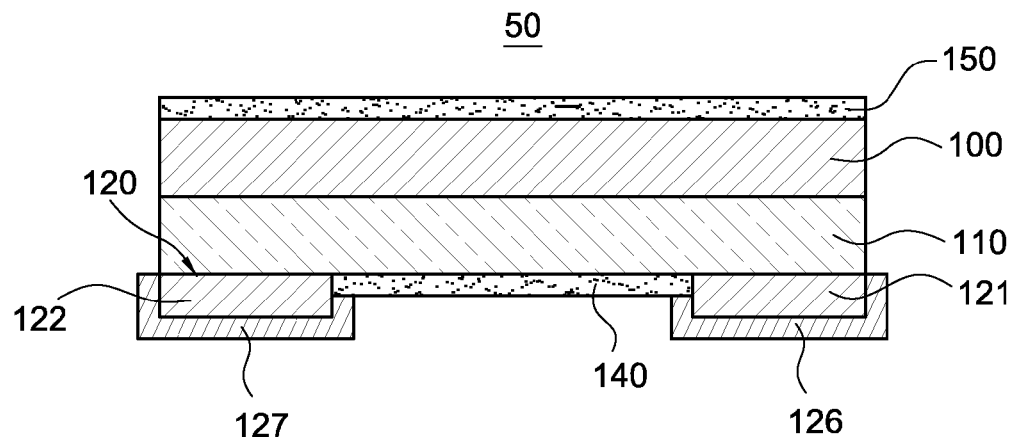
FIG. 5 shows a sectional view of a fourth embodiment of resistive device according to the invention.

Please refer to FIG. 5. FIG. 5 shows the fourth embodiment of a resistive device according to the present invention. The difference between the fourth embodiment and the first embodiment is that the resistive device 50 of the fourth embodiment has no adhesive layer for adhering the resistive layer 110 on the lower surface of the flexible substrate 100. The resistive layer 110 is directly attached to the flexible substrate 100.

Figure 6A:
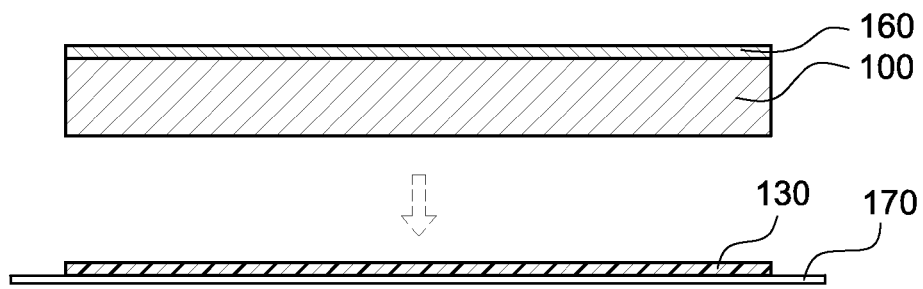
FIG. 6(A) to FIG. 6(G) show schematic view of steps of a method for manufacturing a resistive device of the invention.
Figure 6B:
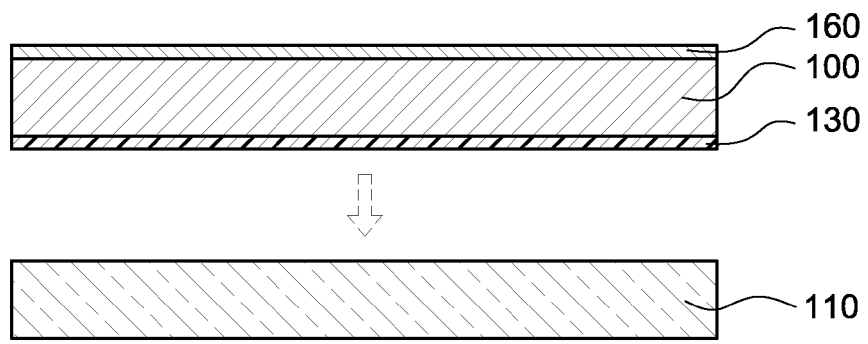
Figure 6C:
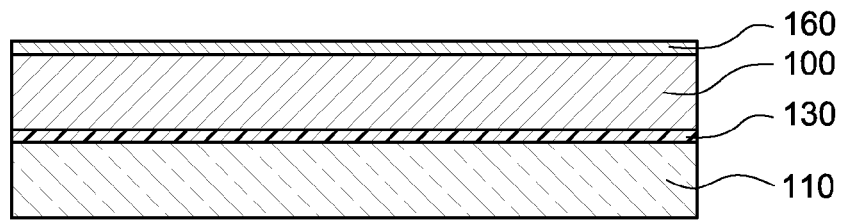

A method for manufacturing a resistive device of the invention is described as following. Please refer to FIG. 6(A)~FIG. 6(G). At first, as shown in FIG. 6(A), a flexible substrate 100 and an adhesive layer 130 are provided, wherein the flexible substrate 100 has a metal layer 160 attached on an upper surface thereof, and the adhesive layer 130 may attach on a release film 170; the release film 170 can be removed after the adhesive layer 130 is attached on the flexible substrate 100. Next, as shown in FIG. 6(B), the flexible substrate 100 is attached on the resistive layer 110 with the adhesive layer 130, and the flexible substrate 100 and the resistive layer 110 adhere close with the adhesive layer 130 by thermal press to form a plate assembly, as shown in FIG. 6(C).

Figure 6D:
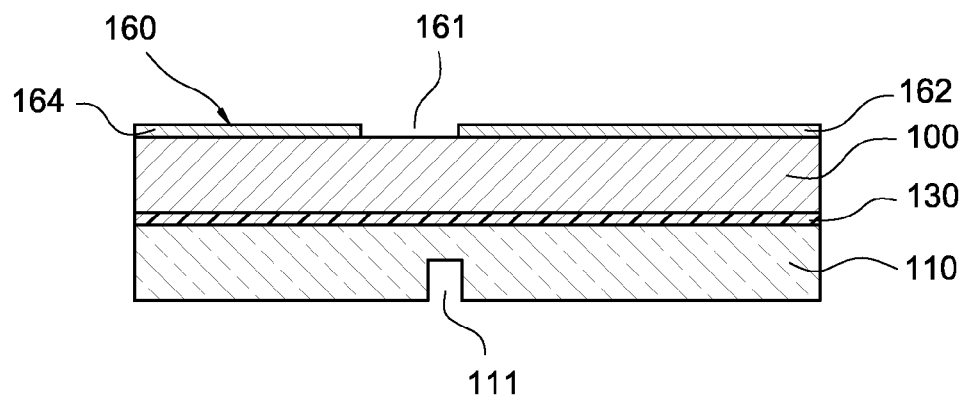

Next, as shown in FIG. 6(D), the resistive layer 110 is etched to form a recess 111 for adjusting the resistance value of the resistive layer 110. Also, the metal layer 160 is etched to form a groove 161, and thus a first metal sheet 162 and a second metal sheet 164 separated with each other are formed.

Figure 6E:
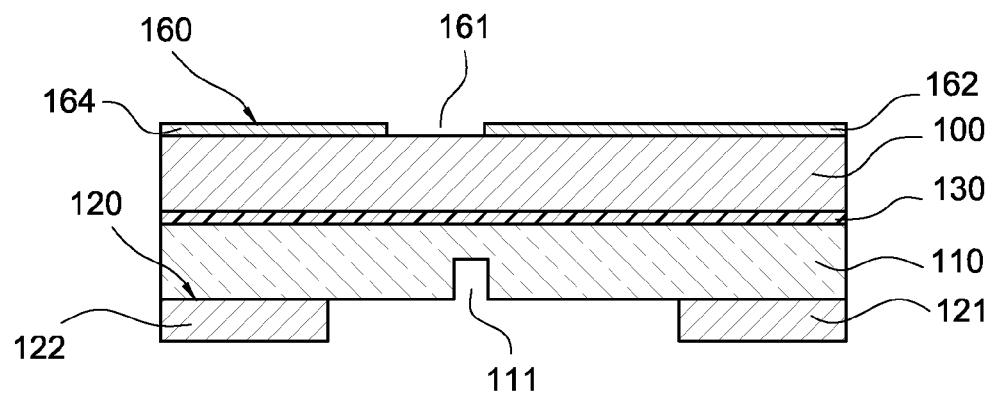

Next, as shown in FIG. 6(E), a first electrode part 121 and a second electrode part 122 having electrical conductive function located at two opposite sides of a lower surface of the resistive layer 110 are formed by electroplating, press fitting or welding process.

Figure 6F:
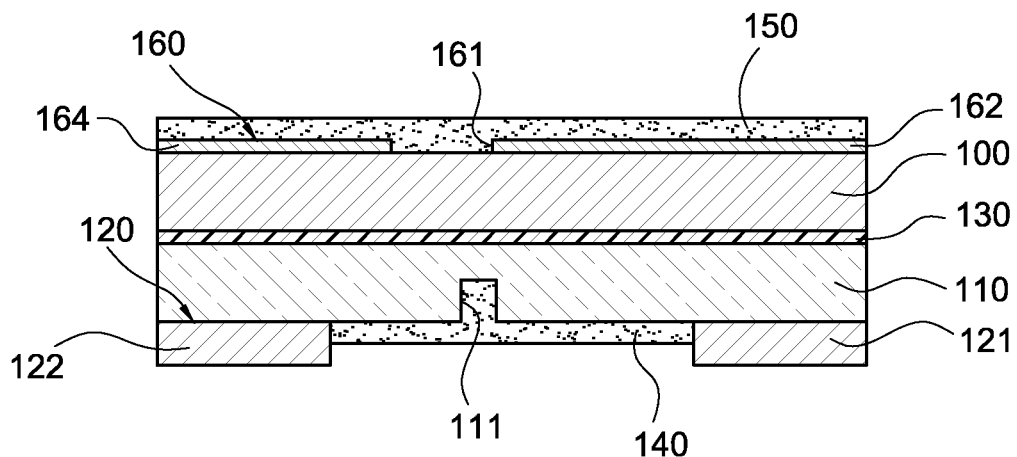

Next, as shown in FIG. 6(F), a first protective layer 140 is formed on the lower surface of the resistive layer 110 between the first electrode part 121 and the second electrode part 122 to prevent the resistive layer 110 from contamination or oxidation. Also, a second protective layer 150 is formed on an upper surface of the flexible substrate 100 to provide enough strength for supporting the resistive device.

Figure 6G:
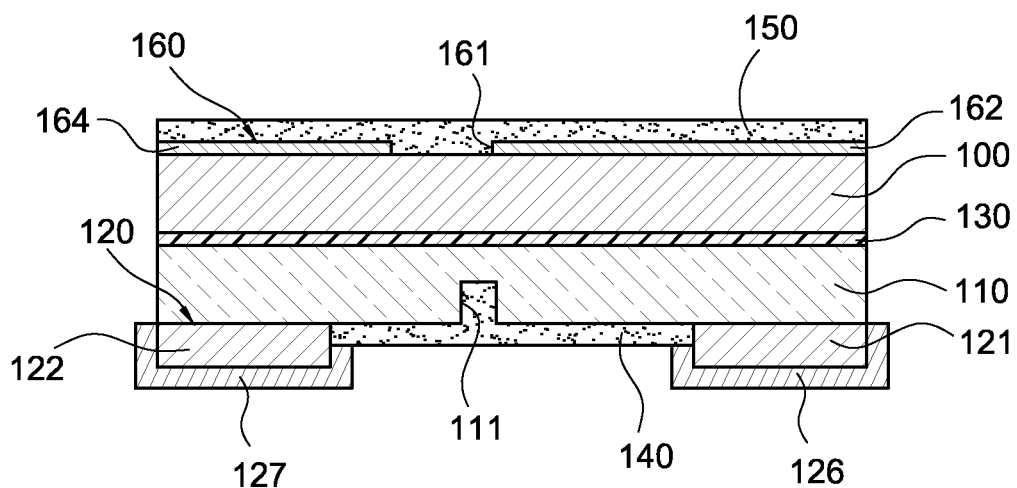

At last, as shown in FIG. 6(G), a first outer welding layer 126 covering the first electrode part 121 and a second outer welding layer 127 covering the second electrode part 122 are formed to increase the adhesion of the first electrode part 121 and the second electrode part 122, and to increase the bonding strength between the resistive device and PCB.

It should be noted, with the above manufacturing method, the flexible substrate 100 having a metal layer 160 on an upper surface thereof is provided in the beginning. In the another embodiment, the above manufacturing method may proceed by only the remaining flexible substrate 100. For example, the embodiment of the method may manufacture the resistive device of FIG. 3 or FIG. 4 with the metal layer 160. The embodiment of the method may manufacture the resistive device of FIG. 2 without the metal layer 160.

Figure 7A:
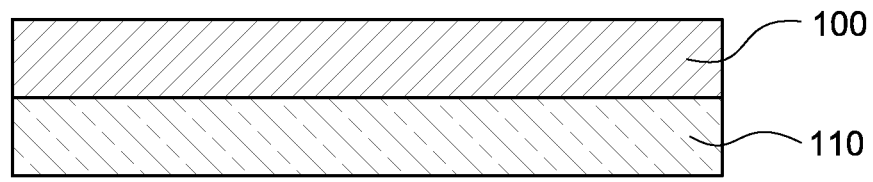
FIG. 7(A) to FIG. 7(E) show schematic view of steps of another method for manufacturing a resistive device of the invention.

As shown in FIG. 7(A)~FIG. 7(E), which illustrate another method for manufacturing a resistive device of the present invention. As shown in FIG. 7(A), a flexible substrate 100 and a resistive layer 110 directly attached with each other are provided, wherein there is no adhesive layer between the flexible substrate 100 and a resistive layer 110 for adhering them. In one embodiment, the flexible substrate 100 is directly formed on the resistive layer 110, for example, a liquid soft material is coated or printed on the resistive layer 110, and then the flexible substrate 100 is formed and attached on the resistive layer 110 by curing the liquid soft material. In another embodiment, the resistive layer 110 may be formed on the flexible substrate 100 by film-forming method, for example, the resistive layer 110 is formed on the flexible substrate 100 by thick film or thin film process.

Figure 7B:
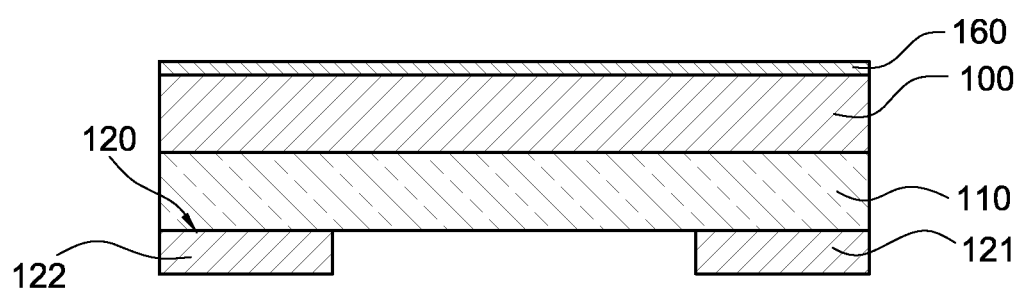

Next, as shown in FIG. 7(B), a first electrode part 121 and a second electrode part 122 having electrical conductive function located at two opposite sides of a lower surface of the resistive layer 110 are formed by electroplating, press fitting or welding process. Also, in this embodiment, a metal layer 160 is further formed on the flexible substrate 100. It should be noted, the metal layer 160 is used for increasing the heat dissipation of the resistive device, and it can be removed if need.

Figure 7C:
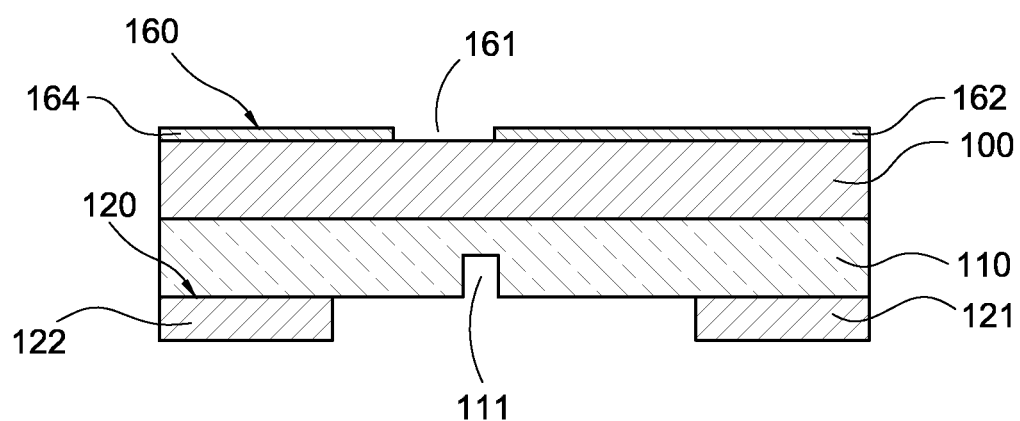

As shown in FIG. 7(C), the resistive layer 110 is etched to form a recess 111 for adjusting the resistance value of the resistive layer 110. Also, the metal layer 160 is etched to form a groove 161, and thus a first metal sheet 162 and a second metal sheet 164 separated with each other are formed.

Figure 7D:
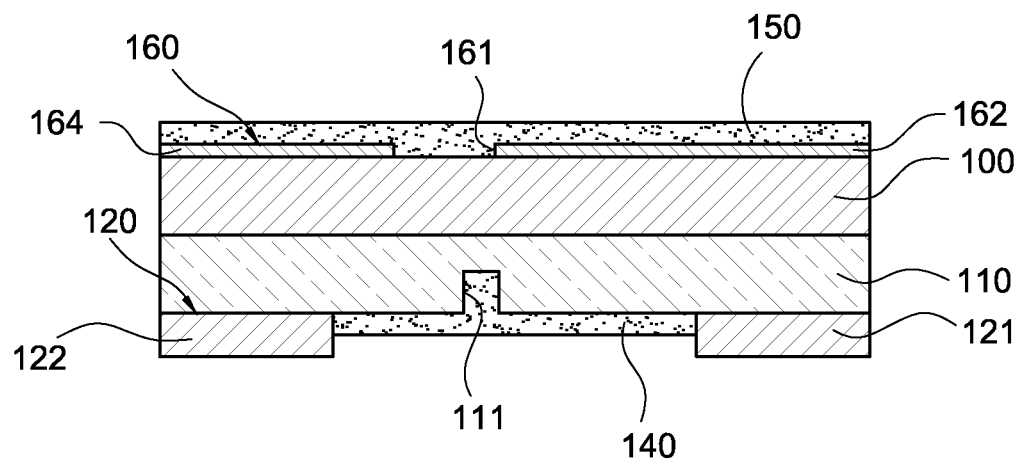

As shown in FIG. 7(D), a first protective layer 140 is formed on the lower surface of the resistive layer 110 between the first electrode part 121 and the second electrode part 122 to prevent the resistive layer 110 from contamination or oxidation. Also, a second protective layer 150 is formed on an upper surface of the flexible substrate 100 to provide enough strength for supporting the resistive device.

Figure 7E:
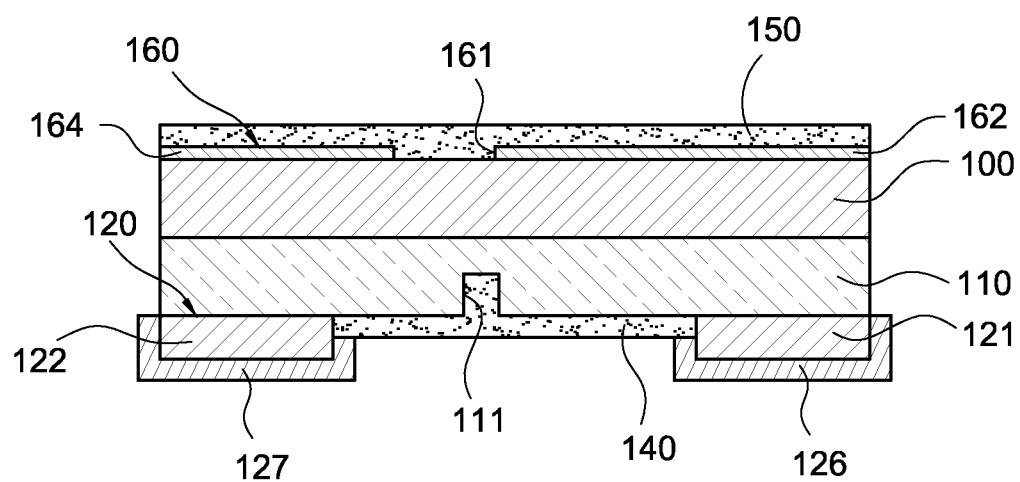

As shown in FIG. 7(E), a first outer welding layer 126 covering the first electrode part 121 and a second outer welding layer 127 covering the second electrode part 122 are formed to increase the adhesion of the first electrode part 121 and the second electrode part 122, and to increase the bonding strength between the resistive device and PCB.

The described embodiments are preferred embodiments of the present invention. However, this is not intended to limit the scope of the invention. The equivalent changes and modifications may be made in accordance with the claims of the invention without departing from the scope of the invention.

What is claimed is:

1. A resistive device with flexible substrate, comprising:
   a flexible substrate with a thickness of 12~45 μm;
   a resistive layer located on the flexible substrate;
   an electrode layer having a first electrode part and a second electrode part located on the resistive layer opposed to the flexible substrate and separated with each other;
   a first outer welding layer covering the first electrode part;
   a second outer welding layer covering the second electrode part;
   a metal layer being directly disposed on the flexible substrate for improving the heat dissipating efficiency; and
   a first protective layer and a second protective layer, wherein the first protective layer is disposed on the resistive layer between the first electrode part and the second electrode part; and
   wherein the second protective layer is disposed on the metal layer, and thus the metal layer is sandwiched between the second protective layer and the flexible substrate, and the second protective layer reinforces the strength of the flexible substrate.

2. The resistive device with flexible substrate of claim 1, further including an adhesive layer between the resistive layer and the flexible substrate.

3. The resistive device with flexible substrate of claim 2, wherein the adhesive layer has material including epoxy or acrylic resin.

4. The resistive device with flexible substrate of claim 1, wherein the metal layer includes a first metal sheet and a second metal sheet separated with each other.

5. The resistive device with flexible substrate of claim 1, wherein the flexible substrate has material of polyimide (PI), polyethylene terephthalate (PET), or bismaleimide-triazine resin (BT resin).

6. The resistive device with flexible substrate of claim 1, wherein the resistive layer is Ni—Cu alloy, Ni—Cr alloy, Fe—Cr alloy or Cu—Mn alloy.

7. The resistive device with flexible substrate of claim 1, wherein the resistive layer is etched to form a recess for adjusting the resistance value of the resistive layer.

* * * * *